United States Patent
Harding

(10) Patent No.: US 7,264,442 B2
(45) Date of Patent: Sep. 4, 2007

(54) SEAL STRUCTURE

(75) Inventor: Adrian L Harding, Derby (GB)

(73) Assignee: Rolls-Royce, PLC, London (GB)

( * ) Notice: Subject to any disclaimer, the term of this patent is extended or adjusted under 35 U.S.C. 154(b) by 0 days.

(21) Appl. No.: 11/252,757

(22) Filed: Oct. 19, 2005

(65) Prior Publication Data

US 2006/0099069 A1    May 11, 2006

(30) Foreign Application Priority Data

Nov. 11, 2004    (GB) .................................. 0424883.7

(51) Int. Cl.
*F01D 11/02*    (2006.01)
(52) U.S. Cl. .................. 415/173.7; 415/174.5
(58) Field of Classification Search ............. 415/170.1, 415/173.7, 174.4, 174.5
See application file for complete search history.

(56) References Cited

U.S. PATENT DOCUMENTS

| 4,184,689 A | | 1/1980 | Brodell et al. |
| 4,309,145 A | * | 1/1982 | Viola ...................... 415/173.7 |
| 5,211,536 A | * | 5/1993 | Ackerman et al. .......... 415/177 |
| 5,522,698 A | * | 6/1996 | Butler et al. ............. 415/170.1 |
| 2003/0226362 A1 | | 12/2003 | Niday et al. |

FOREIGN PATENT DOCUMENTS

DE    43 24 035 A1    1/1995

* cited by examiner

*Primary Examiner*—Edward K. Look
*Assistant Examiner*—Nathan Wiehe
(74) *Attorney, Agent, or Firm*—Oliff & Berridge, PLC

(57) ABSTRACT

A combustion chamber inner casing (24) has a flange (28) on its downstream end. A retaining seal ring (40) is bolted to the flange (28) and traps a flanged seal ring (46) against the flange (28) in a manner that allows the seal ring (46) to move by expansion, relative to seal ring (40).

8 Claims, 3 Drawing Sheets

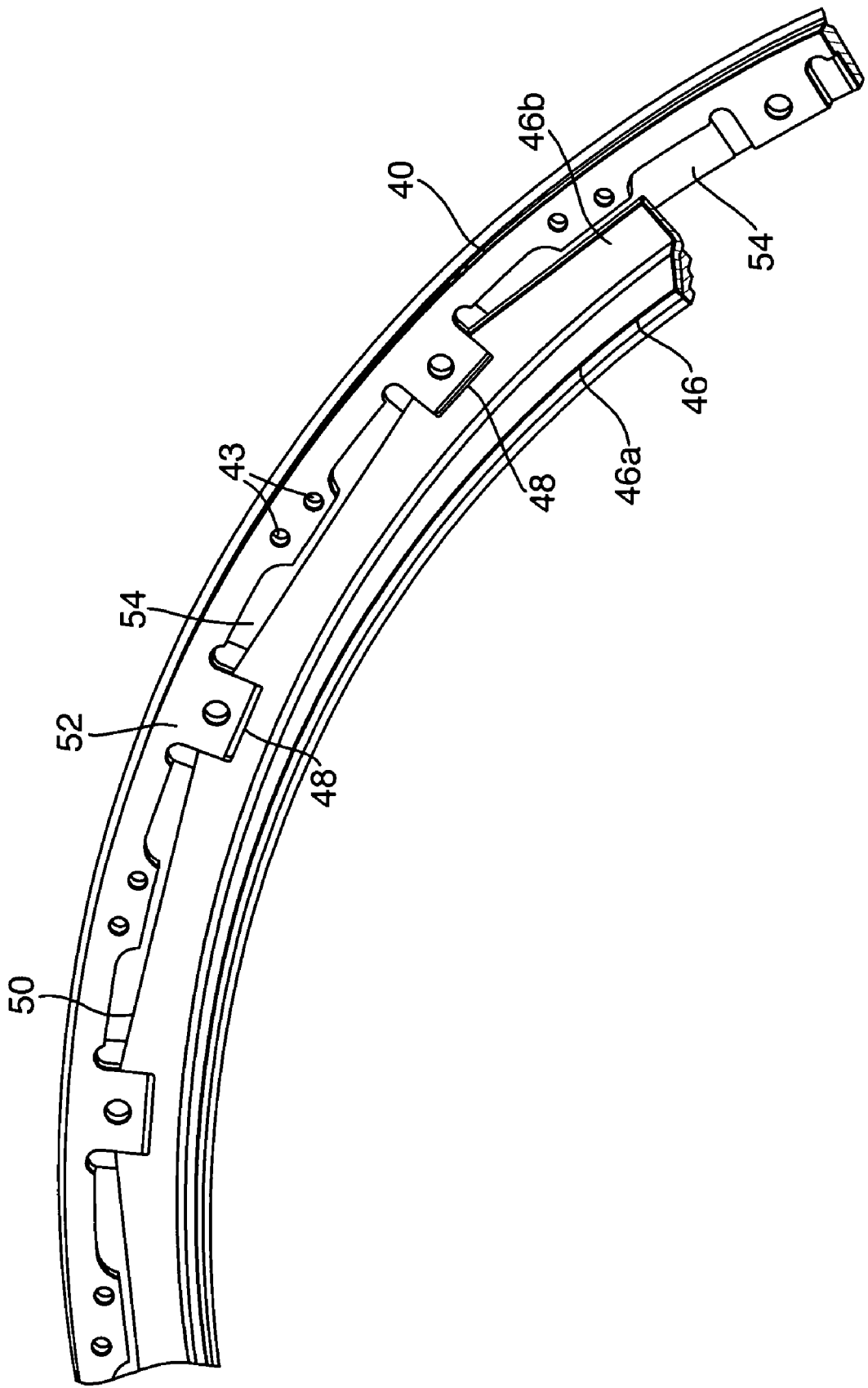

SEAL STRUCTURE

The present invention relates to a seal structure that in use may form part of a complete gas turbine engine. The present invention has particular efficacy when used between fixed and rotating parts.

Known gas turbine engine combustion equipment comprises either a circular array of tubes arranged around the axis of the associate engine, and in which fuel and air are mixed and ignited, or radially spaced coaxial nested casings in which fuel and air are mixed and ignited. In both systems, further respective spaced inner and outer annular casings are provided for, inter alia, the enabling of a flow of cooling air between them and the tubes or first mentioned casings.

It is further know, to provide an annular, radially outwardly turned flange on the downstream end of the further inner casing. That is, downstream with respect to the flow of gases through the associated engine. The flange has nozzle guide vanes located thereabout via rails on their radially inner ends. A one piece seal member is fixed to the downstream face of the flange, and is in the form of a further flanged member having an annular fin seal formed on the outer rim of the flange portion, and which locates under the leading platform portions of a stage of turbine blades downstream of the nozzle guide vanes. Further seal structure is formed on the generally cylindrical portion of the seal member, and co-operates with fin structure on the rotary disc in the rim of which the turbine blades are located.

The arrangement described so far, has drawbacks including the rigid fixing of the seal member to the flange of the inner casing, thus preventing relative radial expansion between the two parts, which results in the fin on the outer edge of the flange of the seal member being unable to maintain its radial positional relationship with the undersides of the blades platforms, which reduces when the blades and their associated disk expand during operational rotation. Conversely, the seal portion on the generally cylindrical portion of the seal member cannot maintain appropriate radial separation from the seal fins on the turbine disc, which increases and results in seal rub and, subsequently, a permanent excessive gap therebetween when the disk and blades expand.

The present invention seeks to provide an improved gas turbine engine seal structure.

According to the present invention a seal structure comprises an annular retaining ring in which the radially inner portion of the one radial face is recessed, and a cylindrical seal carrier having a radially outwardly turned flange sized to nest in said recess with a radial clearance therebetween, said retaining ring being adapted for fixedly connecting to a flange face on a seal structure support means with said flange of said cylindrical member nested in said recess so as to be retained against said flange of said seal structure support means by said retaining ring.

The invention will now be described, by way of example and with reference to the accompanying drawings, in which;

FIG. 4 is a pictorial part view of seal incorporated in the structure of FIGS. 1 to 3.

Figure 1:
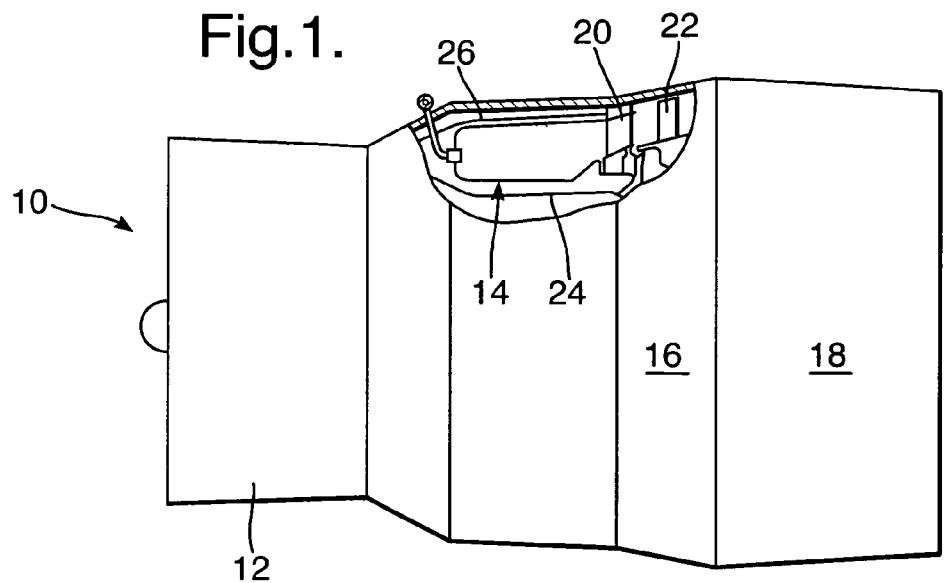
FIG. 1 is a diagrammatic partially sectioned view of a gas turbine engine incorporating a seal structure in accordance with the present invention.

Referring to FIG. 1 a gas turbine engine 10 has a compressor 12, combustion apparatus 14, a turbine section 16, and an exhaust nozzle 18. The combustion apparatus 14 has a stage of nozzle guide vanes 20 at its downstream extremity, that guide hot gases leaving the combustion apparatus 14 has a stage of nozzle guide vanes 20 at its downstream extremity, that guide hot gases leaving the combustion apparatus 14 onto the turbine blades 22 of the turbine stage 16 at an appropriate angle in know manner.

An inner casing 24 and an outer casing 26 define flow paths around the combustion structure 14 for the passage of cooling air from compressor 12.

Figure 2:
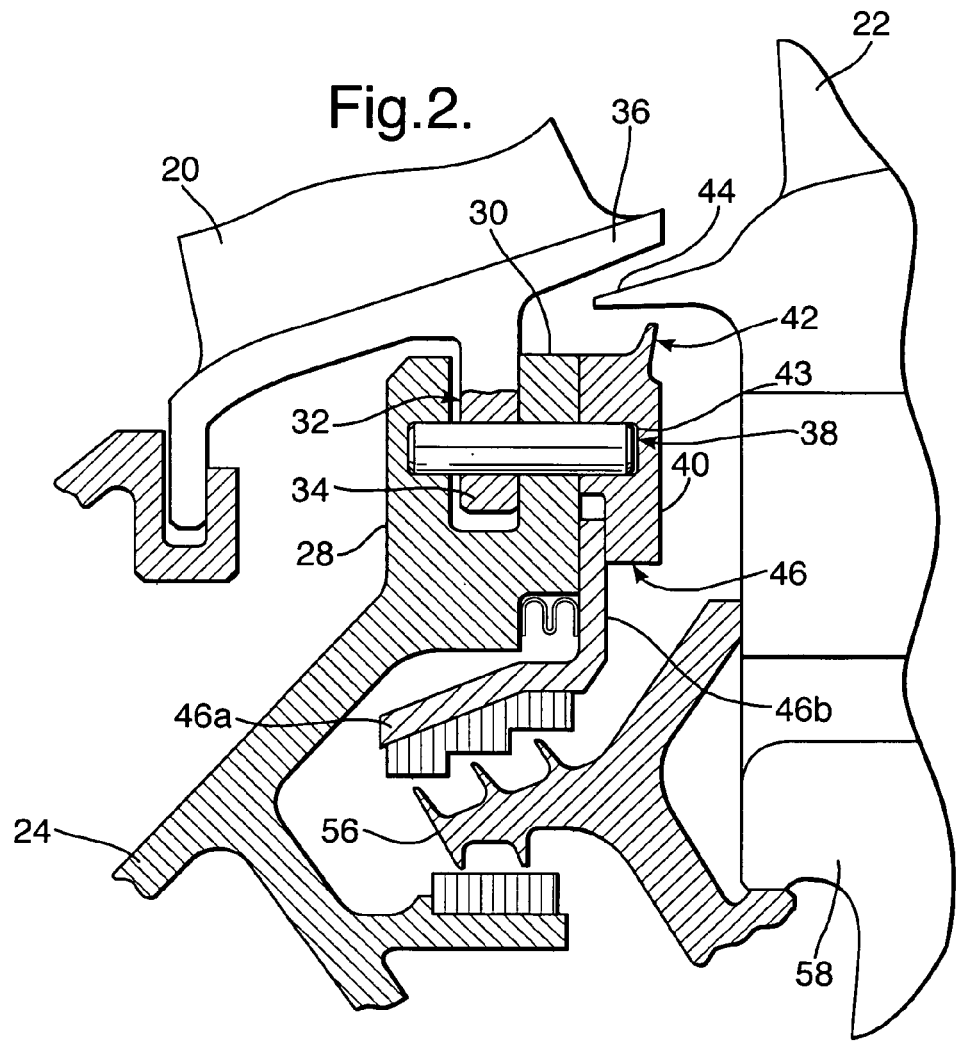
FIG. 2 is an enlarged cross sectional part view of the downstream end structure of the combustion apparatus of the engine of FIG. 1.

Referring now to FIG. 2, inner casing 24 has an outwardly turned flange 28 at its downstream end, ie outwardly turned with respect to the longitudinal axis of the engine 10. The rim 30 of flange 28 has a groove 32 formed in it, in which rails 34 on the undersides of platforms 36 of guide vanes 20 are located, and held there by dowels 38.

A retaining seal ring structure 40 abuts the downstream face of flange 28. The sealing portion is defined by an annular fin 42 protruding from the downstream edge of it rim 30, and its retaining features are explained later in this specification. Ring 40 is drilled at appropriate places 43 to receive the ends of dowels 38 that protrude from flange 28, so as to be concentrically positioned on flange 28 with respect to the engine axis, and thereby ensure fin 42 is concentric with respect to the undersides of the platforms 44 on the turbine blades 22 of the turbine stage 16.

A further seal carrying structure 46 has a near cylindrical portion 46a, the downstream end of which has an outwardly turned flange 46b that also abuts the downstream face of flange 28. Flange 46b has rectangular cut outs 48 (FIGS. 3 and 4) in an equally angularly spaced about its rim 50, so as to enable cross key location of those rim portions 50 between rectangular proud portions 52, formed in relieved surface portions 54 in the flange abutting face of seal ring 40. By this means, when seal members 40 and 46 are assembled on flange 28, at which juncture seal ring 40 is fastened to flange 28 by nuts and bolts assemblies 29, (FIG. 3) the relieved surface 54 on seal 40 traps seal 46 against the opposing surface of flange 28, and in conjunction with the cross key engagement, retains it against bodily displacement axially and radially of engine 10. However, the retaining force is such as to allow seal structure 46 to grow radially under the effect of heat experienced thereby, during operation of the associated engine 10. By this means, seal structure 46 expands radially outwardly at the same time as an adjacent seal 56 moves radially outwardly when turbine disk 58 to which it is attached, grown through exertion of centrifugal forces thereon, coupled with expansion through increasing temperature. Rubbing between the two seals 46 and 58 is thus avoided.

Figure 3:
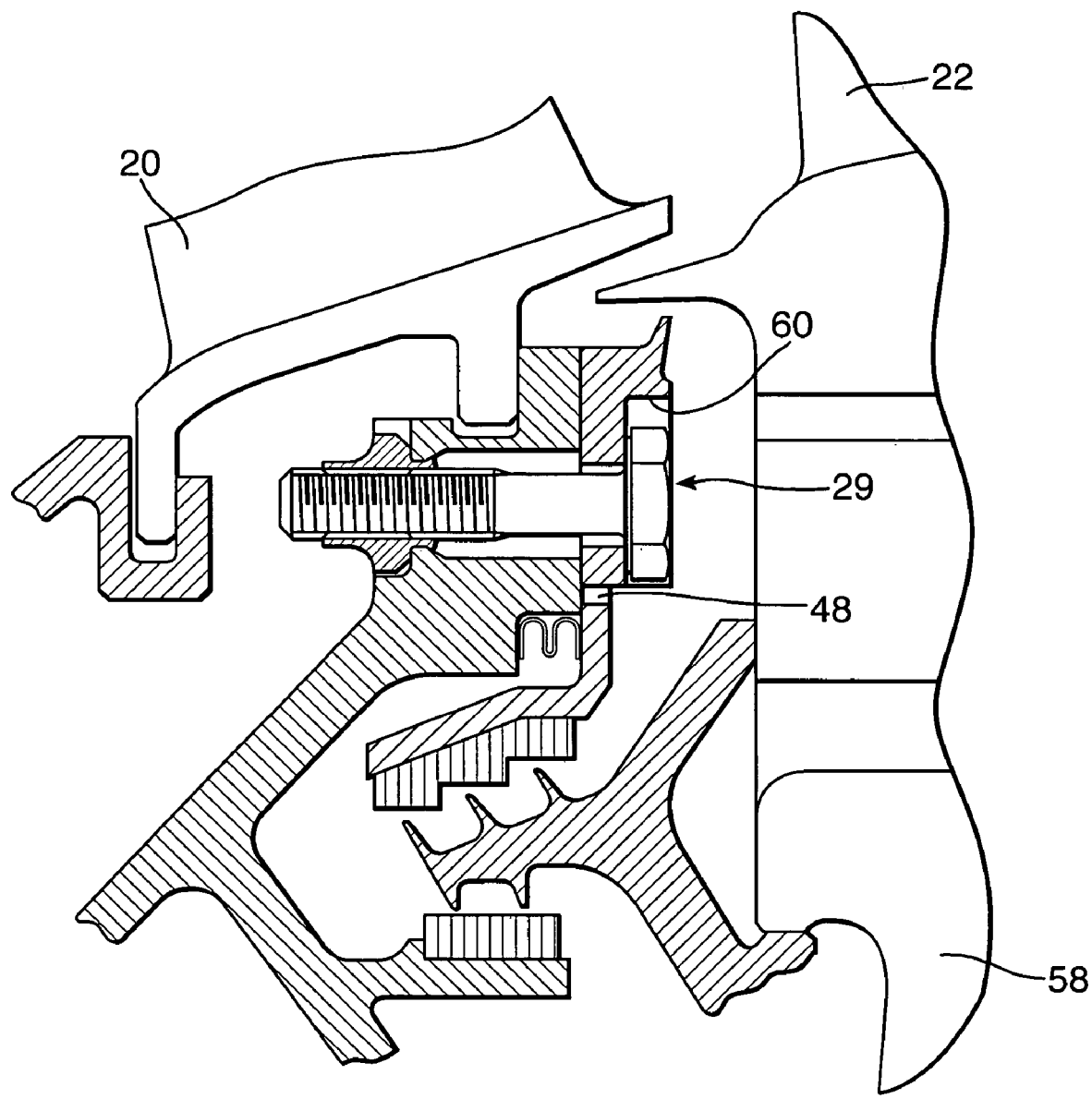
FIG. 3 is a further enlarged cross sectional part view of the downstream end structure of the combustion apparatus of the engine of FIG. 1, which view is angularly displaced from the view of FIG. 2.

Referring still to FIG. 3, the downstream face of retaining seal ring 40 has local recesses 60 that cover the heads of the bolts of assembly 29, so as to reduce windage losses, ie to reduce turbulence in leakage air flow over the face of turbine disk 58.

Referring to FIG. 4, the rim portions of flange 46 between the cut-outs are machined chordally and this, coupled with the relieved surface 54, results in an assembly of considerably reduced weight relative to the prior art.

The skilled man having read this specification, will appreciated that seal structures of the kind described and illustrated herein, without departing from the concept, can be adapted for use in any structure that comprises adjacent, normally fixed parts that operate in an environment that tends to cause relative expansion therebetween. By 'fixed' is meant holding station with respect to each other, whether static or relatively rotating about a fixed datum, eg a gas turbine engine axis.

I claim:

1. A seal structure comprising:

an annular retaining ring having a radially inner portion with a radial face which radial face is recessed, and a cylindrical seal carrier having a radially outwardly turned flange sized to nest in said recess with a radial clearance therebetween, said retaining ring being adapted for fixedly connecting to a face of a flange on a seal structure support means with said flange of said cylindrical seal carrier nested in said recess, so as to be retained against said flange of said seal structure support means by said retaining ring, wherein said seal carrier flange has rectangular cut outs in and equally angularly spaced about its rim and said retaining ring has correspondingly shaped and spaced proud portions on that face that abuts said flange of said seal structure support means, so as to enable cross key location of said seal carrier in said retaining ring.

2. A seal structure as claimed in claim 1 wherein said seal structure support means comprises a casing around the exterior of which in an operative environment a combustion chamber structure is arranged in radially spaced relationship therewith.

3. A seal structure as claimed in claim 2 wherein said casing terminates in said flange adjacent the gas exit end of said combustion chamber structure.

4. A seal structure as claimed in 3 wherein said casing forms part of a gas turbine engine.

5. A seal structure as claimed in claim 1 wherein the rim of said flange on said seal structure support means is grooved for the receipt of rails formed on the undersides of a stage of nozzle guide vanes.

6. A seal structure as claimed in claim 5 wherein said nozzle guide vanes rails are retained in said groove by dowels that fit in aligned holes through said flange.

7. A seal structure as claimed in claim 6 wherein said dowels protrude from said flange and said retaining ring is located thereon.

8. A seal structure as claimed in claim 1 wherein said retaining ring is bolted to said flange of said seal structure support means.

* * * * *